US011482032B2

(12) United States Patent
Qing et al.

(10) Patent No.: US 11,482,032 B2
(45) Date of Patent: Oct. 25, 2022

(54) DISPLAY DEVICE AND ASSEMBLY METHOD THEREOF

(71) Applicants: Chengdu BOE Optoelectronics Technology Co., Ltd., Sichuan (CN); BOE Technology Group Co., Ltd., Beijing (CN)

(72) Inventors: Xin Qing, Beijing (CN); Qiang Tang, Beijing (CN); Li Zeng, Beijing (CN); Feng Xiao, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 45 days.

(21) Appl. No.: 16/959,047

(22) PCT Filed: Aug. 1, 2019

(86) PCT No.: PCT/CN2019/098866
§ 371 (c)(1),
(2) Date: Jun. 29, 2020

(87) PCT Pub. No.: WO2021/016986
PCT Pub. Date: Feb. 4, 2021

(65) Prior Publication Data
US 2022/0004735 A1    Jan. 6, 2022

(51) Int. Cl.
*G06V 40/13*     (2022.01)
*G06F 1/16*      (2006.01)

(52) U.S. Cl.
CPC ............ *G06V 40/13* (2022.01); *G06F 1/1637* (2013.01)

(58) Field of Classification Search
None
See application file for complete search history.

(56) References Cited

U.S. PATENT DOCUMENTS 6,612,888 B1    9/2003  Pai et al.
2019/0004354 A1* 1/2019  Hsiao ................. G06K 9/00053
(Continued)

FOREIGN PATENT DOCUMENTS

CN    108388844 A    8/2018
CN    108549499 A    9/2018
(Continued)

OTHER PUBLICATIONS

International search report of PCT application No. PCT/CN2019/098866 dated May 6, 2020.
(Continued)

*Primary Examiner* — Joseph R Haley
(74) *Attorney, Agent, or Firm* — Fay Sharpe LLP

(57) ABSTRACT

The display device includes a display panel, a fingerprint identification module, a fingerprint identification flexible circuit board, and a frame sealant, wherein the fingerprint identification module is disposed on a non-display side of the display panel, the fingerprint identification module includes a fingerprint identification region and a peripheral region surrounding the fingerprint identification region; the frame sealant is at least partially disposed between the display panel and the peripheral region of the fingerprint identification module; and wherein at least one opening is provided on a side of an orthographic projection of the frame sealant on the display panel proximal to the fingerprint identification flexible circuit board, and the at least one opening being at least partially overlapped with an orthographic projection of the fingerprint identification flexible circuit board on the display panel.

18 Claims, 15 Drawing Sheets

(56) References Cited

U.S. PATENT DOCUMENTS

2019/0147214 A1    5/2019  Lee et al.
2021/0174048 A1*   6/2021  Song ..................... G02B 17/08

FOREIGN PATENT DOCUMENTS

| CN | 109460731 A | 3/2019 |
| CN | 109614961 A | 4/2019 |
| CN | 109784262 A | 5/2019 |
| EP | 3480732 A1  | 5/2019 |
| JP | 2010135213 A | 6/2010 |

OTHER PUBLICATIONS

Extended European search report of counterpart European application No. 19930189.6 dated Jul. 7, 2022.

* cited by examiner

DISPLAY DEVICE AND ASSEMBLY METHOD THEREOF

CROSS-REFERENCE TO RELATED APPLICATION

The present application is a 371 of PCT Application No. PCT/CN2019/098866, filed on Aug. 1, 2019, the entire contents of which are incorporated by reference herein.

TECHNICAL FIELD

The present disclosure relates to the technical field of display, and more particularly, relates to a display device and an assembly method thereof.

BACKGROUND

With the development of display technology, more and more display devices are provided with a function of fingerprint identification. The display device with the function of fingerprint identification includes a display panel, a fingerprint identification module, and a fingerprint identification flexible circuit board. The fingerprint identification module is usually arranged on a non-display side of the display panel.

SUMMARY

Embodiments of the present disclosure provide a display device and an assembly method thereof, and the technical solutions are as follows.

In one aspect, a display device is provided. The display device includes a display panel, a fingerprint identification module, a fingerprint identification flexible circuit board, and a frame sealant;

the fingerprint identification module is disposed on a non-display side of the display panel, the fingerprint identification module includes a fingerprint identification region and a peripheral region surrounding the fingerprint identification region, and the peripheral region is arranged with a first connection terminal;

the fingerprint identification flexible circuit board is provided with a second connection terminal, and the second connection terminal is electrically connected with the first connection terminal; and the frame sealant is at least partially disposed between the display panel and the peripheral region of the fingerprint identification module, and is configured to bond the fingerprint identification module and the display panel;

wherein at least one opening is provided on a side of an orthographic projection of the frame sealant on the display panel proximal to the fingerprint identification flexible circuit board, and the at least one opening being at least partially overlapped with an orthographic projection of the fingerprint identification flexible circuit board on the display panel.

Optionally, the span of a region where the frame sealant is provided with an opening in a reference direction is less than or equal to a width of the fingerprint identification flexible circuit board in the reference direction, and the reference direction intersecting an opening direction of the opening.

Optionally, the orthographic projection of the fingerprint identification flexible circuit board on the display panel covers the at least one opening.

Optionally, the frame sealant is provided with an opening.

Optionally, the display device further includes an edge sealant layer, wherein an orthographic projection of an outer frame of the frame sealant on the display panel surrounds an orthographic projection of the edge sealant layer on the display panel, and the fingerprint identification module and the frame sealant are both attached to the edge sealant layer.

Optionally, a distance between an inner frame and an outer frame of the frame sealant, at any position of the frame sealant, ranges approximately from 2.5 mm to 3 mm.

Optionally, the display device further includes an edge sealant layer, wherein an orthographic projection of an outer frame of the edge sealant layer on the display panel surrounds the orthographic projection of the frame sealant on the display panel, and the fingerprint identification module, the frame sealant, and the display panel are all attached to the edge sealant layer.

Optionally, a distance between an inner frame and the outer frame of the frame sealant, at any position of the frame sealant, ranges approximately from 1.5 mm to 1.8 mm.

Optionally, a region enclosed by the frame sealant and the at least one opening is in a polygonal shape, and the frame sealant, except for a side thereof provided with the opening, is attached to the fingerprint identification module by the edge sealant layer.

Optionally, the region enclosed by the frame sealant and the at least one opening is in a rectangular shape.

Optionally, the edge sealant layer is attached to a side of the fingerprint identification module.

Optionally, the orthographic projection of the outer frame of the frame sealant on the display panel surrounds the orthographic projection of the fingerprint identification module on the display panel.

Optionally, the frame sealant is provided with a plurality of openings, and a distance between each adjacent two openings is equal.

Optionally, the frame sealant is provided with a plurality of openings, opening surfaces of the plurality of openings being equal in size.

In another aspect, an assembly method of the display device is provided. The method includes:

attaching a side of frame sealant to a non-display side of a display panel;

attaching a peripheral region of a fingerprint identification module to the opposite side of the frame sealant, wherein the fingerprint identification module is provided with a fingerprint identification region and the peripheral region surrounding the fingerprint identification region; and bonding a second connection terminal of a fingerprint identification flexible circuit board and a first connection terminal in the peripheral region, wherein at least one opening is provided on a side of an orthographic projection of the frame sealant on the display panel proximal to the fingerprint identification flexible circuit board, and the at least one opening being at least partially overlapped with an orthographic projection of the fingerprint identification flexible circuit board on the display panel.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

For clearer descriptions of the objects, technical solutions and advantages in the present disclosure, the implementation of the present disclosure is described in detail below in combination with the accompanying drawings.

The working principle of the display device with the function of fingerprint identification is as follows: when a finger touches the display panel on the light-emitting side of the display panel, the light emitted by the display panel may be irradiated onto the finger and reflected by the surface of the finger; and the reflected light is irradiated onto the fingerprint identification module, wherein the fingerprint identification module collects fingerprint image based on the received light, and the fingerprint identification flexible circuit board is used for fingerprint identification of the fingerprint image.

In the related art, frame sealant is provided on the non-display side of the display panel, and the fingerprint identification module is fixed connected with the display panel by the frame sealant. In addition, in order to ensure that the reflected light can be irradiated onto the fingerprint identification module, a barrier between a fingerprint identification region (also known as a light-receiving region) of the fingerprint identification module and the display panel is usually avoided, and a proper distance between the fingerprint identification region of the fingerprint identification module and the display panel needs to be ensured. Therefore, the frame sealant currently used is in a frame shape.

As known by the inventor, a frame sealant is provided on a non-display side of a display panel, and the fingerprint identification module is fixed connected with the display panel by the frame sealant. After the frame sealant is attached to the display panel and the fingerprint identification module, the region enclosed by the frame sealant, the display panel, and the fingerprint identification module becomes a closed region. An air pressure in the enclosed region becomes larger under high temperature and high humidity conditions, which generates a greater force on the display panel, resulting in an indentation on the screen of the display panel and even damage to the display panel.

Figure 1:
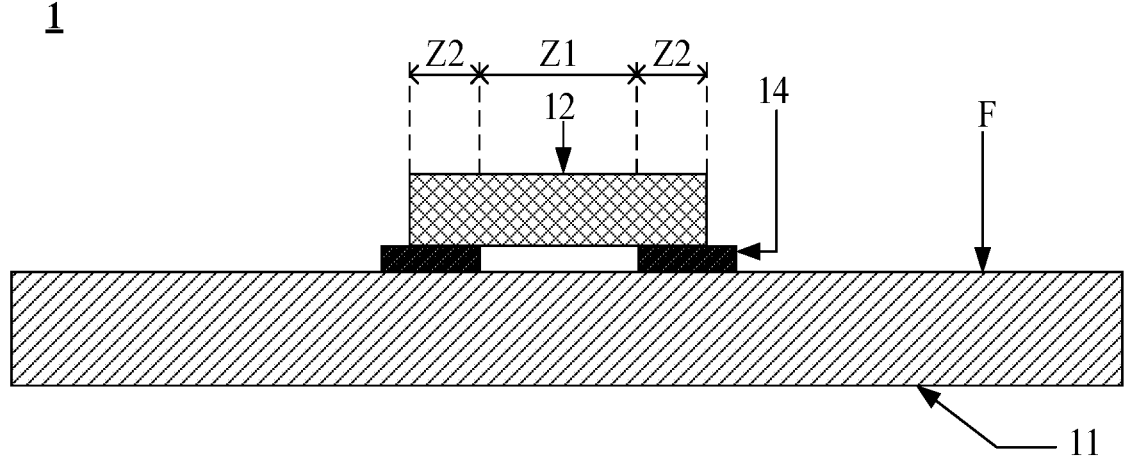
FIG. 1 is a structural diagram of a display device according to the embodiments of the present disclosure.
Figure 2:
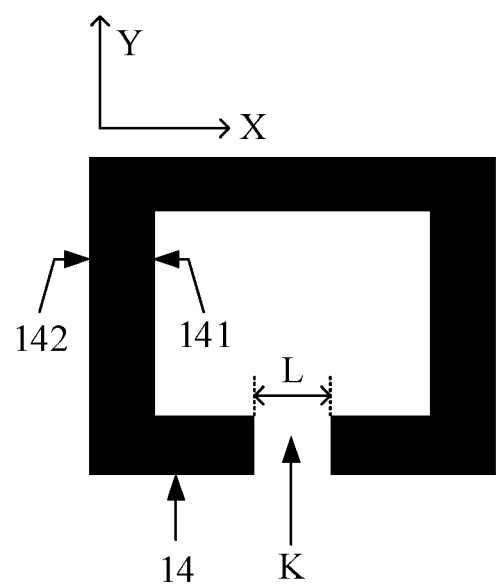
FIG. 2 is a top view diagram of an opening according to the embodiments of the present disclosure.
Figure 3:
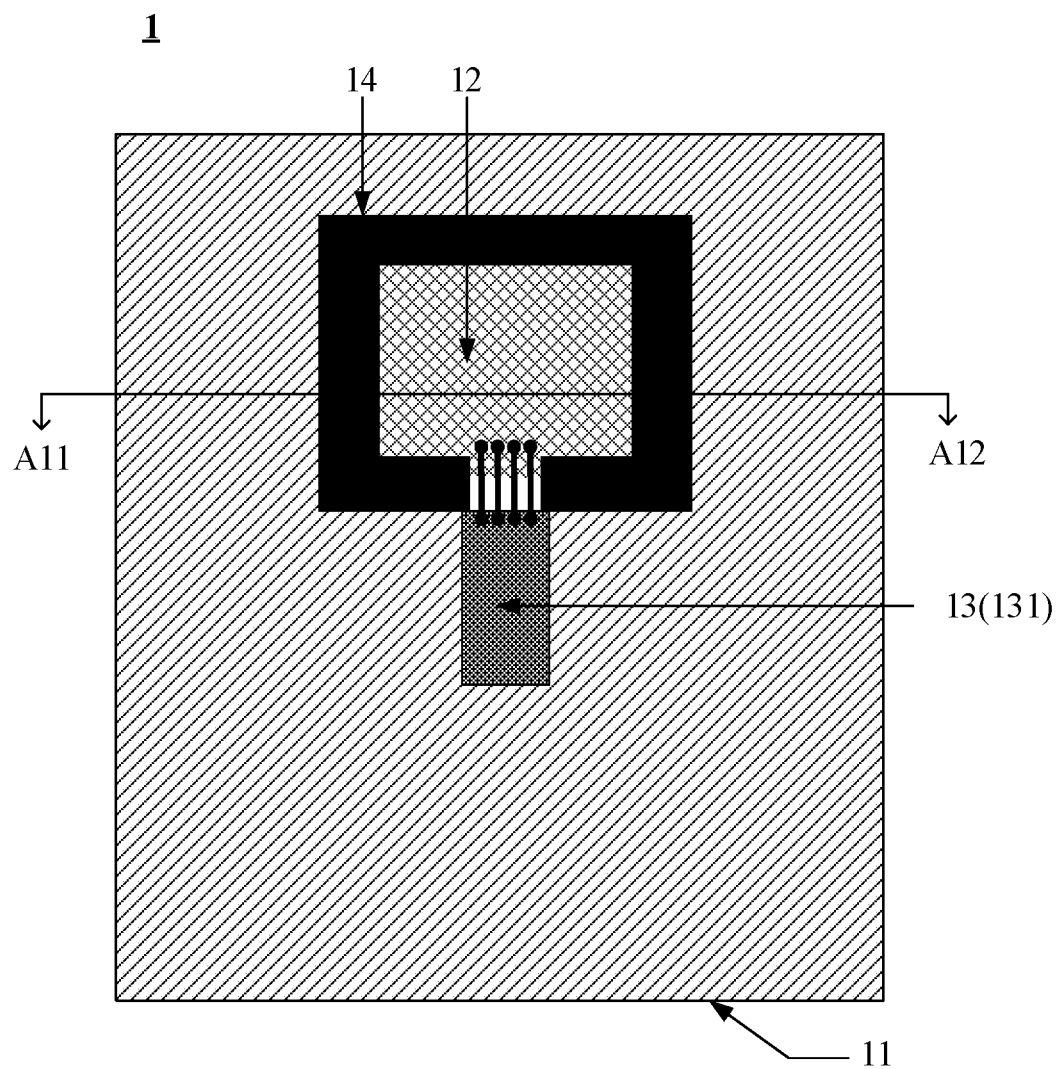
FIG. 3 is a top view diagram of a display device according to the embodiments of the present disclosure.

Embodiments of the present disclosure provide a display device and, as shown in FIGS. 1 to 3, the display device 1 includes a display panel 11, a fingerprint identification module 12, a fingerprint identification flexible circuit board 13, and a frame sealant 14. FIG. 1 is a cross-sectional view of the display device at A11 to A12 in FIG. 3.

The fingerprint identification module 12 is disposed on a non-display side F of the display panel 11, the fingerprint identification module 12 includes a fingerprint identification region Z1 and a peripheral region Z2 surrounding the fingerprint identification region, and the peripheral region Z2 is arranged with the first connection terminal.

The fingerprint identification flexible circuit board 13 is provided with a second connection terminal, and the second connection terminal is electrically connected with the first connection terminal. The first connection terminal and the second connection terminal are shown as line segments of which endpoints are dots in FIG. 3.

The frame sealant 14 is at least partially disposed between the display panel 11 and the peripheral region Z2 of the fingerprint identification module 12, and is configured to bond the fingerprint identification module 12 and the display panel 11.

At least one opening K is provided on a side of the orthographic projection of the frame sealant 14 on the display panel 11 proximal to the fingerprint identification flexible circuit board 13, that is, a side of the frame sealant 14 proximal to the fingerprint identification flexible circuit board is provided with at least one opening K. Moreover, the at least one opening K is at least partially overlapped with an orthographic projection of the fingerprint identification flexible circuit board 13 on the display panel 11.

Figure 4:
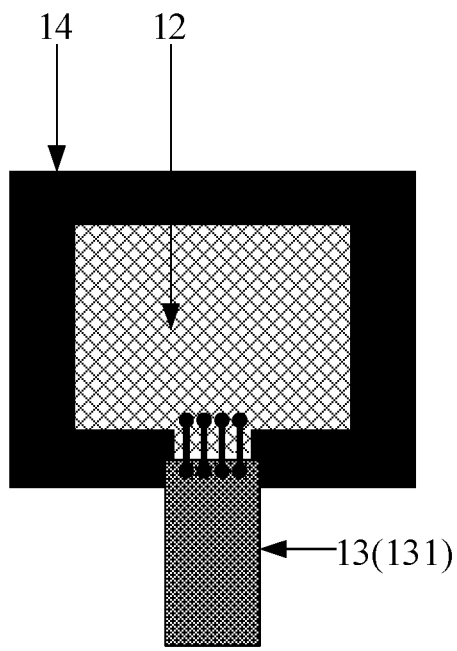
FIG. 4 is a schematic diagram of an opening arrangement of a frame sealant according to the embodiments of the present disclosure.
Figure 5:
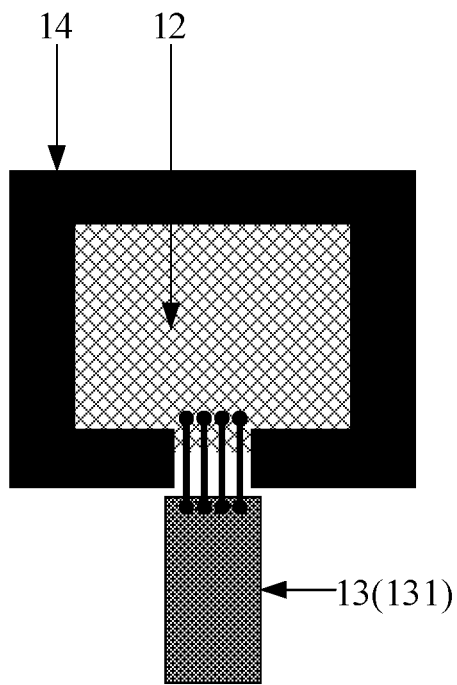
FIG. 5 is a schematic diagram of an opening arrangement of another frame sealant according to the embodiments of the present disclosure.

Exemplarily, it is assumed, as shown in FIG. 2, that the orthographic projection of the frame sealant 14 on the display panel 11 has an opening K on the side proximal to the fingerprint identification flexible circuit board 13. At this moment, positional relationship between the opening K and the fingerprint identification flexible circuit board 13 may satisfy any of the followings. As shown in FIG. 3, the fingerprint identification flexible circuit board 13 includes a second connection terminal and a circuit board 131, wherein the opening is partially overlapped with an orthographic projection of the second connection terminal on the display panel 11, and the edge of the circuit board 131 contacts with a side of the frame sealant 14 proximal to the circuit board 131. Alternatively, as shown in FIG. 4, the fingerprint identification flexible circuit board 13 includes a second connection terminal and a circuit board 131, wherein the opening is overlapped with an orthographic projection of the circuit board 131 on the display panel 11, and the opening is also overlapped with the orthographic projection of the second connection terminal on the display panel 11. Alternatively, as shown in FIG. 5, the fingerprint identification flexible circuit board 13 includes a second connection terminal and a circuit board 131, wherein the opening is partially overlapped with the orthographic projection of the second connection terminal on the display panel 11, and the edge of the circuit board 131 does not contact with the side of the frame sealant 14 proximal to the circuit board 131.

In summary, in the display device according to the embodiment of the present disclosure, as the frame sealant is provided with the opening, the region enclosed by the frame sealant, the display panel, and the fingerprint identification module is no longer a closed region after the frame sealant is attached respectively to the display panel and the fingerprint identification module, such that air pressure in the region enclosed by the frame sealant, the display panel, and the fingerprint identification module can be kept as consistent as possible with outer air pressure, and thus the force generated on the display panel due to pressure difference of the above two air pressure is reduced, and the probability for occurrence of indentation and damage on the display panel is reduced.

The display device may be any product or component with a display function, such as an electronic paper, a mobile phone, a tablet computer, a television, a display, a notebook computer, a digital photo frame or a navigator. Exemplarily, the display device may be an organic light-emitting diode (OLED) display device.

Optionally, as shown in FIG. 2, a span L of a region where the frame sealant is provided with the opening K in a reference direction X may be less than or equal to a width of the fingerprint identification flexible circuit board 13 in the reference direction X. The reference direction X intersects an opening direction Y of the opening. FIG. 2 is a schematic diagram of the reference direction X being perpendicular to the opening direction Y of the opening.

Figure 6:
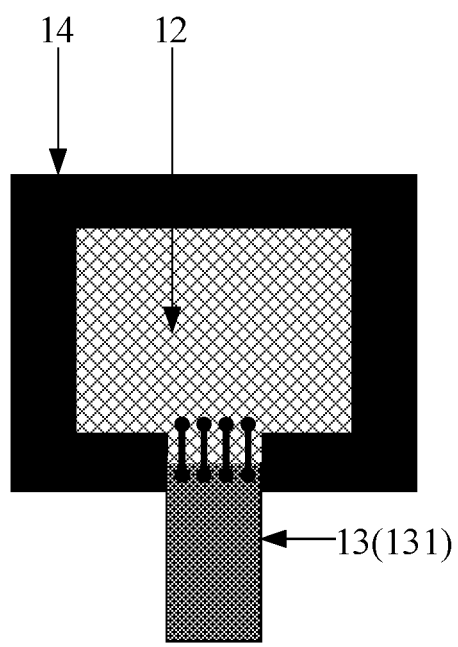
FIG. 6 is a schematic diagram of an opening arrangement of yet another frame sealant according to the embodiments of the present disclosure.

In addition, as shown in FIGS. 4 and 6, an opening arrangement may also satisfy the condition that the orthographic projection of the circuit board 131 of the fingerprint identification flexible circuit board 13 on the display panel 11 at least partially covers the at least one opening. At this moment, on the one hand, a support force to the fingerprint identification flexible circuit board 13 is provided by using the frame sealant 14 on each side of the opening; on the other hand, cut surfaces of the frame sealant 14 formed at the opening can be shielded by the fingerprint identification flexible circuit board 13, such that probability of pollution on the cut surface due to dust or the like is reduced.

Figure 7:
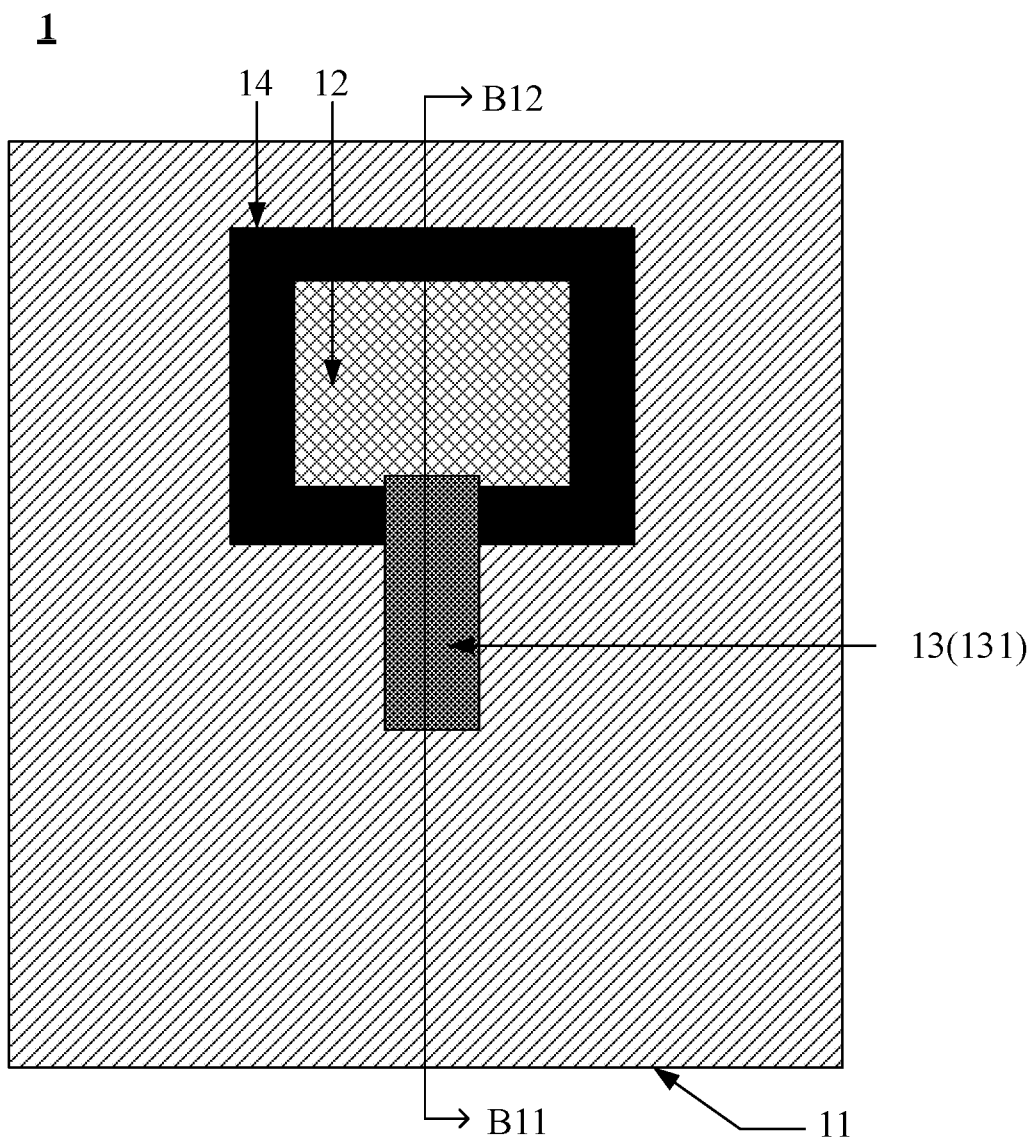
FIG. 7 is a top view diagram of another display device according to the embodiments of the present disclosure.
Figure 8:
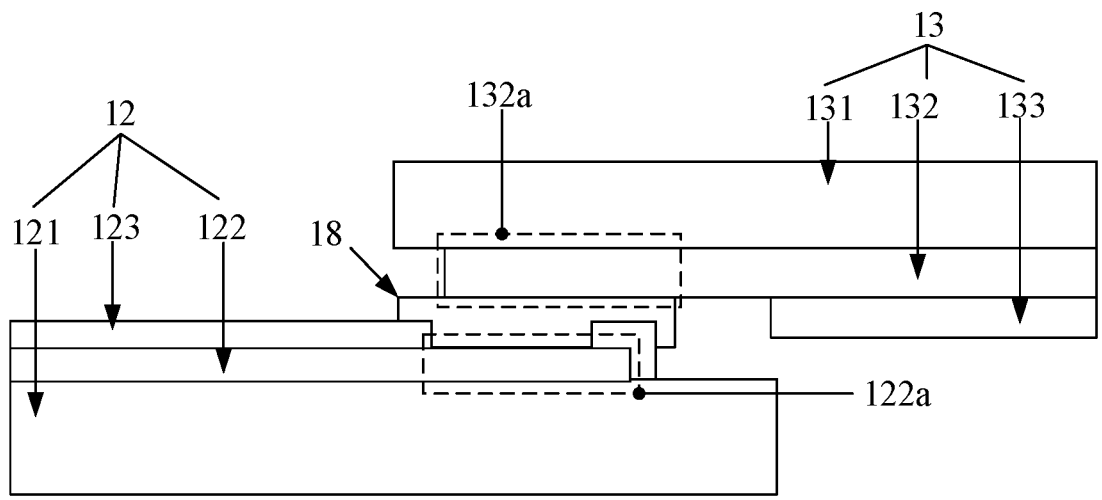
FIG. 8 is a cross-sectional view of a connection between a first connection terminal and a second connection terminal at B11 to B12 in FIG. 7 according to the embodiments of the present disclosure.

In addition, with reference to FIG. 7, the orthographic projection of the fingerprint identification flexible circuit board 13 on the fingerprint identification module 12 partially covers the fingerprint identification module 12. At this moment, with reference to FIG. 8 for the connection between the first connection terminal and the second connection terminal, FIG. 8 is a cross-sectional view of the connection between the first connection terminal and the second connection terminal at B11 to B12 in FIG. 7. As shown in FIG. 8, the fingerprint identification module 12 may include a first insulating layer 121, a fingerprint identification circuit layer 122, and a second insulating layer 123 that are stacked in sequence. The second insulating layer 123 covers a partial surface of the fingerprint identification circuit layer 122, and a portion of the fingerprint identification circuit layer 122, which is not covered by the second insulating layer 123, is used as the first connection terminal 122a. The fingerprint identification flexible circuit board 13 may include a third insulating layer 131, a fingerprint identification circuit layer 132, and a fourth insulating layer 133 that are stacked in sequence. The fourth insulating layer 133 covers a partial surface of the fingerprint identification circuit layer 132. A portion of the fingerprint identification circuit layer 132, which is not covered by the fourth insulating layer 133, is used as the second connection terminal 132a. The second connection terminal 132a is arranged opposite to the first connection terminal 122a, and a conductive adhesive 18 is arranged between the second connection terminal 132a and the first connection terminal 122a, so that the second connection terminal 132a is electrically connected with the first connection terminal 122a by the conductive adhesive 18.

Figure 9:
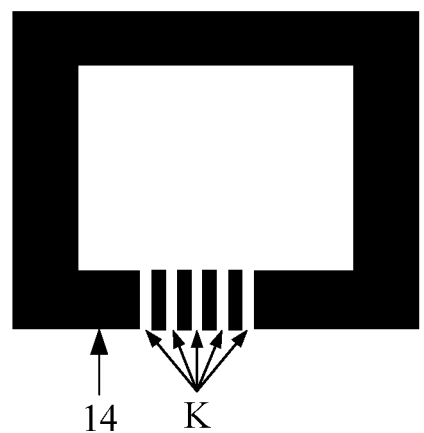
FIG. 9 is a top view diagram of another opening according to the embodiments of the present disclosure.

Further, the number of openings on the frame sealant 14 may be provided according to practical requirements. For example, as shown in FIGS. 2 to 6, the frame sealant 14 may be provided with an opening. For example, as shown in FIG. 9, the frame sealant 14 may be provided with a plurality of openings K. At this moment, the air inside the region enclosed by the frame sealant 14, the display panel 11, and the fingerprint identification module 12 may be circulated with the air outside of the region by the openings at different positions, which may further reduce the pressure difference between the inside and outside of the region.

Optionally, as shown in FIG. 9, when the frame sealant 14 is provided with the plurality of openings K, a distance between each adjacent two openings K in the plurality of openings K may be equal. When the distance between each adjacent two openings is equal, the uniformity of the support force provided by the frame sealant 14 to the fingerprint identification flexible circuit board 13 may be improved, such that the frame sealer 14 around the plurality of openings may share the pressure generated by the fingerprint identification flexible circuit board 13 more evenly, prevent deformation of the frame sealer 14 caused by the uneven pressure on the frame sealer 14, and ensure the effective attaching between the display panel 11 and the fingerprint identification module 12.

Moreover, opening surfaces of the plurality of openings may also be equal in size. At this moment, the sizes of the plurality of openings are relatively uniform. On the one hand, it may ensure uniformity of the air pressure at different openings; on the other hand, the frame sealant 14 around the plurality of openings may evenly share the pressure generated by the fingerprint identification flexible circuit board 13, which prevents deformation of the frame sealant 14 caused by the uneven pressure on the frame sealant 14.

As shown in FIGS. 10 to 13, the display device 1 further includes an edge sealant layer 15. The edge sealant layer 15 is at least used for attaching the fingerprint identification module 12 and the frame sealant 14 to enhance the attaching capability between the fingerprint identification module 12 and the frame sealant 14.

Figure 10:
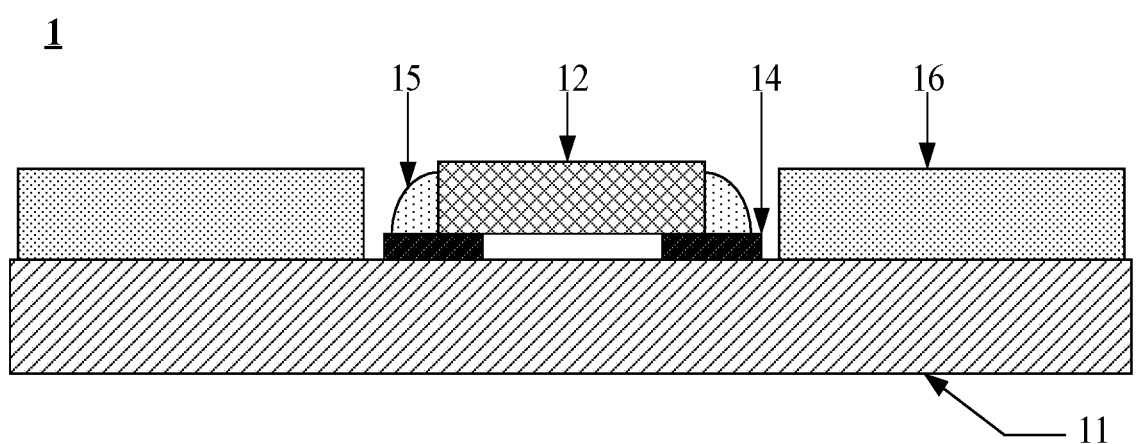
FIG. 10 is a structural diagram of another display device according to the embodiments of the present disclosure.
Figure 11:
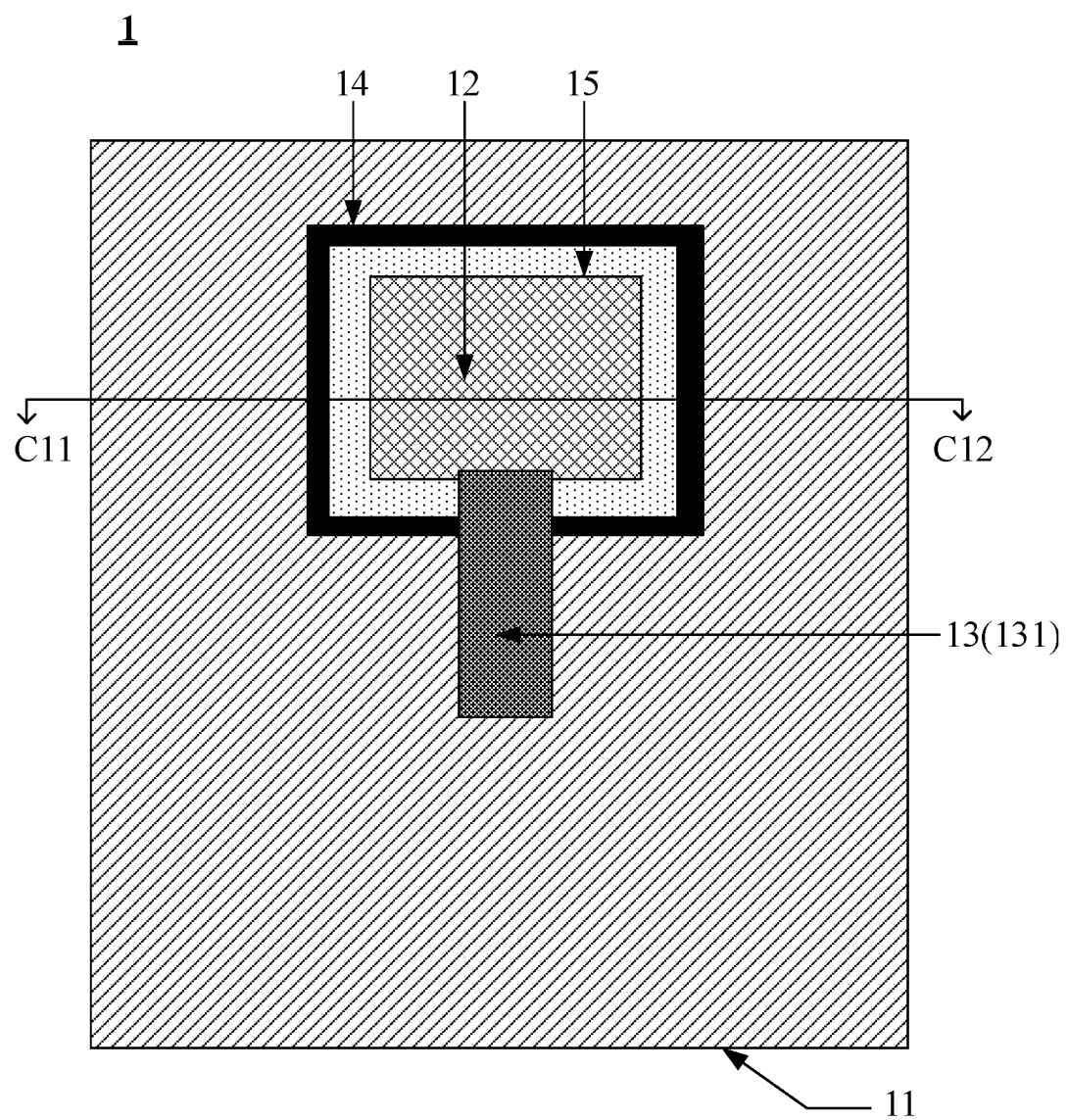
FIG. 11 is a top view diagram of still another display device according to the embodiments of the present disclosure.

In a first arrangement of the edge sealant layer 15, as shown in FIGS. 10 and 11, an orthographic projection of an outer frame of the frame sealant 14 on the display panel 11 surrounds an orthographic projection of the edge sealant layer 15 on the display panel 11. At this moment, the fingerprint identification module 12 and the frame sealant 14 are both attached to the edge sealant layer 15. FIG. 10 is a cross-sectional view of the display device at C11 to C12 in FIG. 11.

As known by the inventor, characteristics such as Young's modulus and curing shrinkage of the display panel 11, the frame sealant 14, and the edge sealant layer 15 are quite different. If any two of the display panel 11, the frame sealant 14, and the edge sealant layer 15 are in contact with each other, it is easy to cause indentation on the display panel 11. In the display device 1 according to the embodiment of the present disclosure, the edge sealant layer 15 is attached respectively to the fingerprint identification module 12 and the frame sealant 14, such that the contact between the edge sealant layer 15 and the display panel 11 can be avoided, which reduces the force generated by the edge sealant layer 15 on the display panel 11 and further reduces indentation created by the force; and at the same time, reduces interference of the force onto touch signal and improves the accuracy of positioning the fingerprint.

Optionally, in order to realize the first arrangement of the edge sealant layer, as shown in FIG. 2, a distance between an inner frame 141 and an outer frame 142 of the frame sealant 14 may be widened based on the frame sealant 14 in the related art, without changing the size of the edge sealant layer. For example, the size of the outer frame of the frame sealant 14 may be increased to keep the size of the inner frame equal to or slightly larger than the size of the fingerprint identification region Z1 of the fingerprint identification module 12. At this moment, a distance between the inner frame and the outer frame of the frame sealant 14, at any position of the frame sealant 14, may range approximately from 2.5 mm to 3 mm. Here, "approximately" may be understood as that the distance between the inner frame and the outer frame of frame sealant 14 may fluctuate within an error range of 5% of the distance ranging from 2.5 mm to 3 mm.

Figure 12:
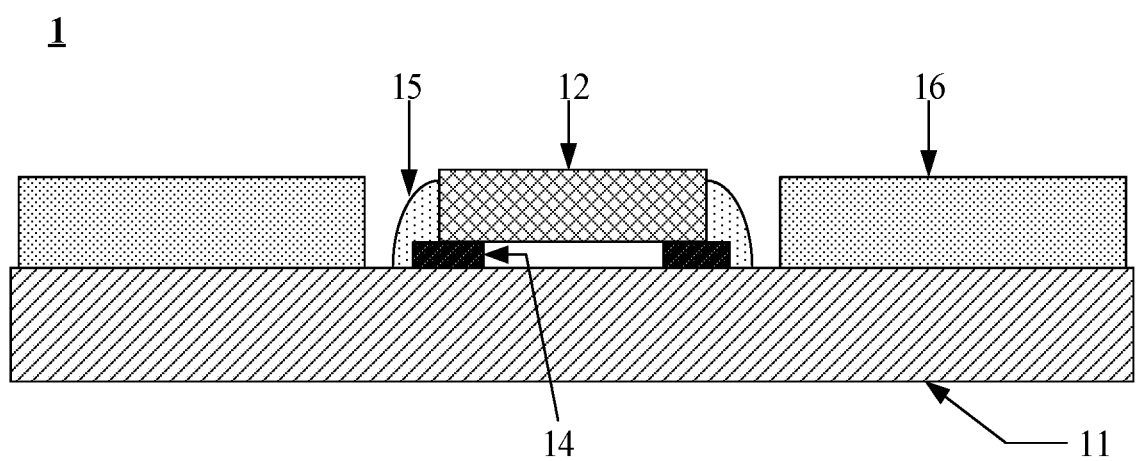
FIG. 12 is a structural diagram of yet another display device according to the embodiments of the present disclosure.
Figure 13:
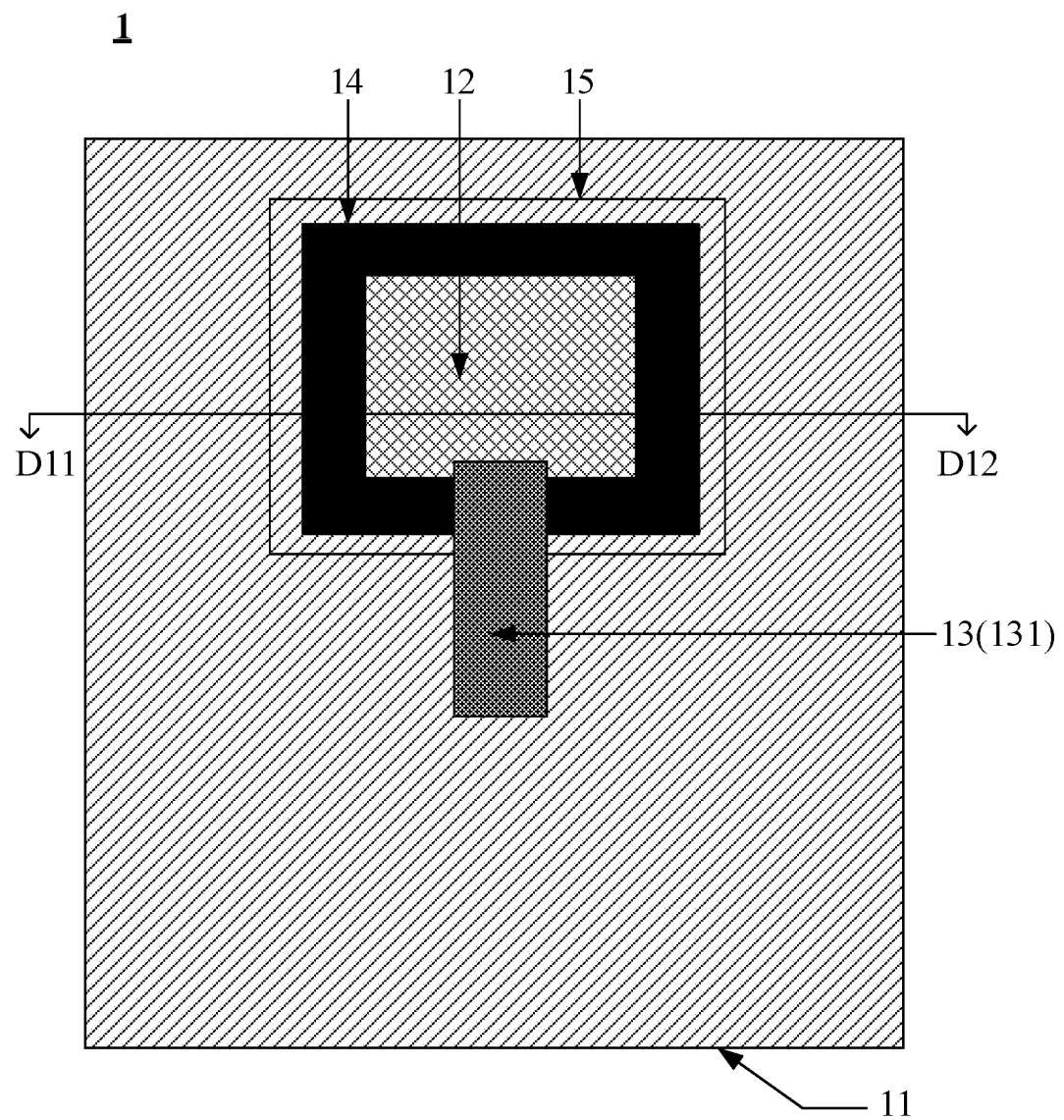
FIG. 13 is a top view diagram of yet another display device according to the embodiments of the present disclosure.

In a second arrangement of the edge sealant layer 15, as shown in FIGS. 12 and 13, the orthographic projection of the outer frame of the edge sealant layer 15 on the display panel 11 may surround the orthographic projection of the frame sealant 14 on the display panel 11. At this moment, the fingerprint identification module 12, the frame sealant 14, and the display panel 11 are all attached to the edge sealant layer 15. FIG. 12 is a cross-sectional view of the display device at D11 to D12 in FIG. 13, and in order to facilitate viewing the frame sealant 14 covered by the edge sealant layer 15, the edge sealant layer 15 is shown in a translucent manner in FIG. 13.

In the second arrangement, the size of the frame sealant 14 may satisfy the following: the distance between the inner frame and the outer frame of the frame sealant 14, at any position of the frame sealant 14, ranges approximately from 1.5 mm to 1.8 mm.

Figure 14:
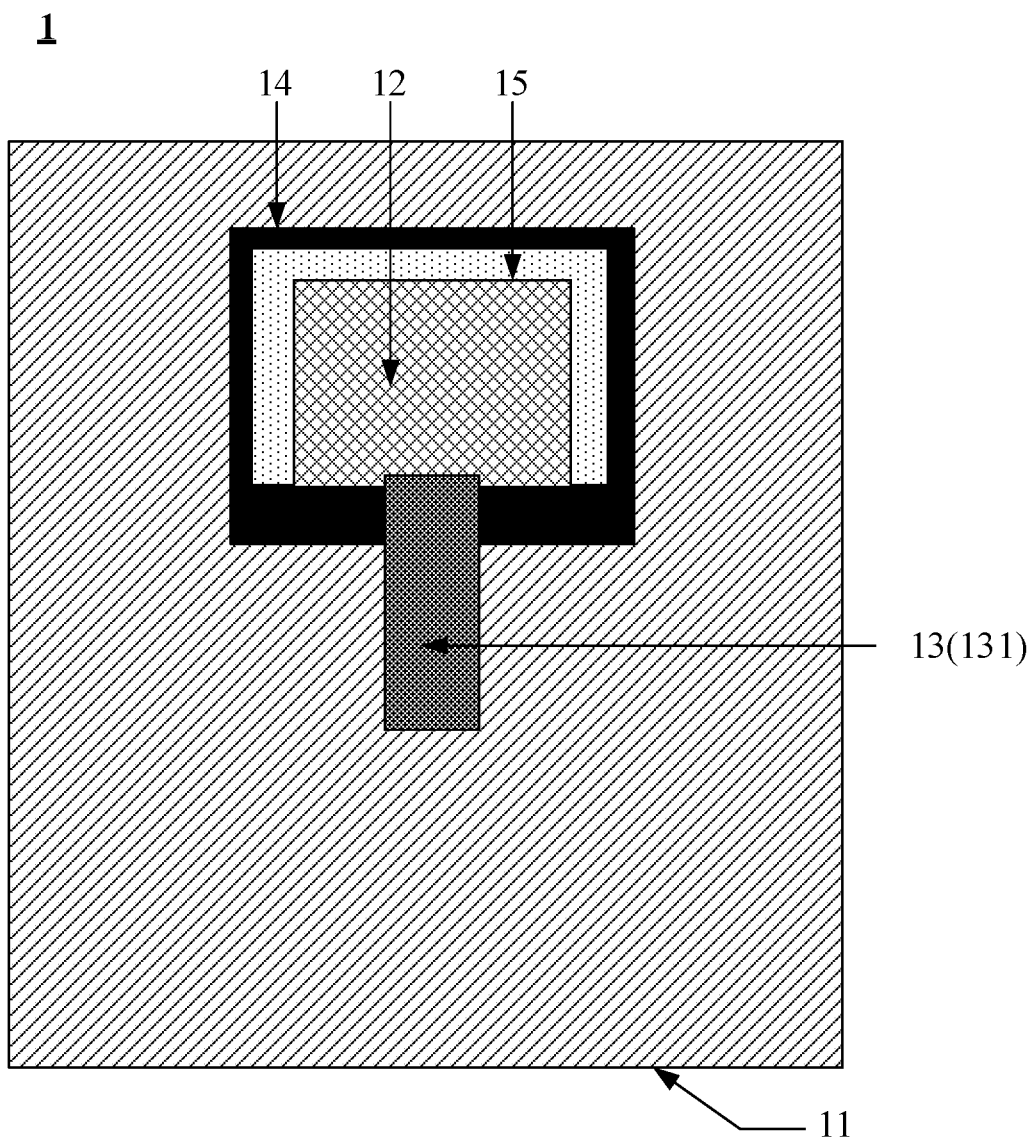
FIG. 14 is a top view diagram of still another display device according to the embodiments of the present disclosure.
Figure 15:
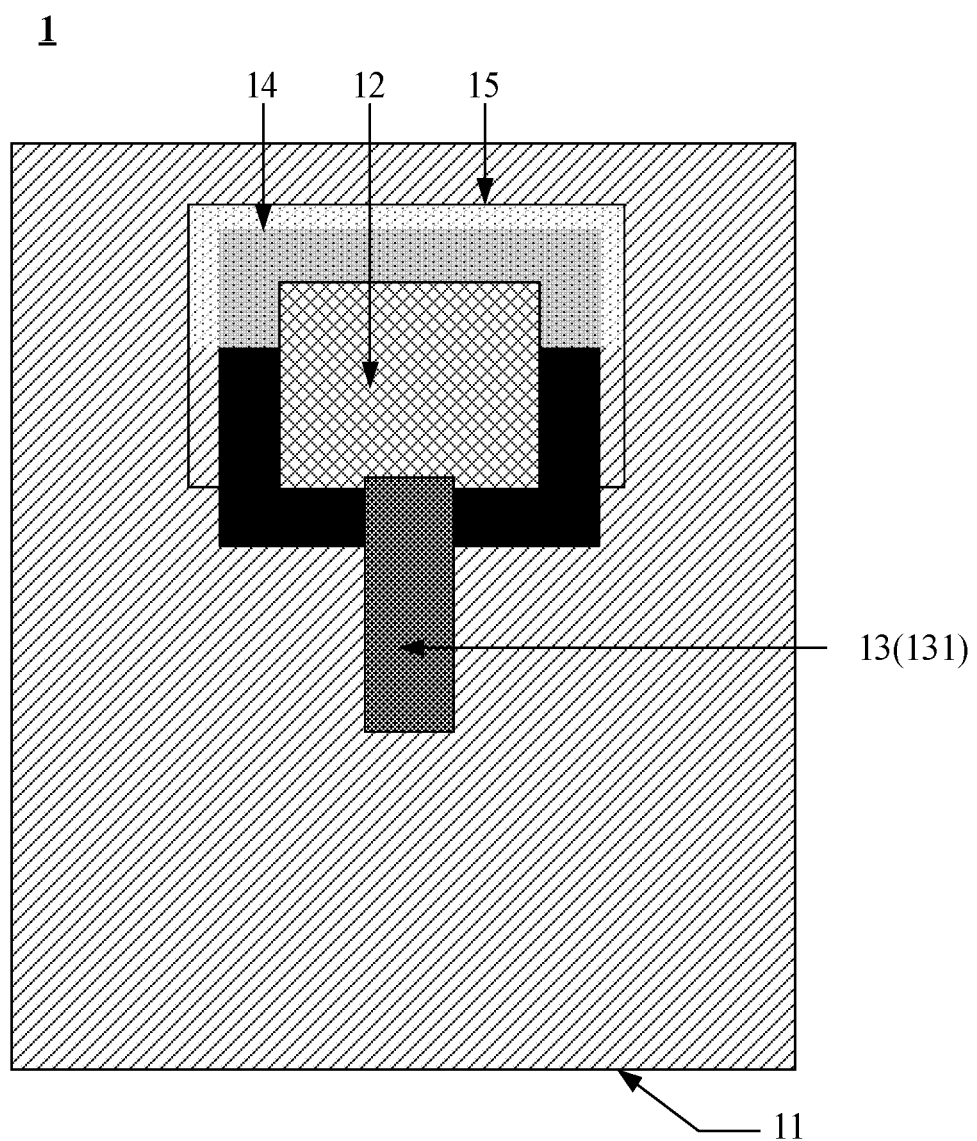
FIG. 15 is a top view diagram of still yet another display panel according to the embodiments of the present disclosure.

Optionally, since an region enclosed by the frame sealant 14 and the at least one opening is in a polygonal shape, as shown in FIGS. 14 and 15, the arrangement position of the edge sealant may satisfy the following: the frame sealant 14, except for a side thereof provided with the opening, is attached to the fingerprint identification module 12 by the edge sealant layer 15. For example, the region enclosed by the frame sealant 14 and the at least one opening may be in a rectangular shape, and the rectangular frame sealant 14 is provided with an opening on a side proximal to the fingerprint identification flexible circuit board 13. At this moment, other three sides of the rectangular frame sealant 14 may be attached to the fingerprint identification module 12 by the edge sealant layer 15.

Alternatively, all the positions where the frame sealant 14 is not provided with the opening may be attached to the fingerprint identification module by the edge sealant layer 15, which is not specifically limited in the embodiments of the present disclosure.

Figure 16:
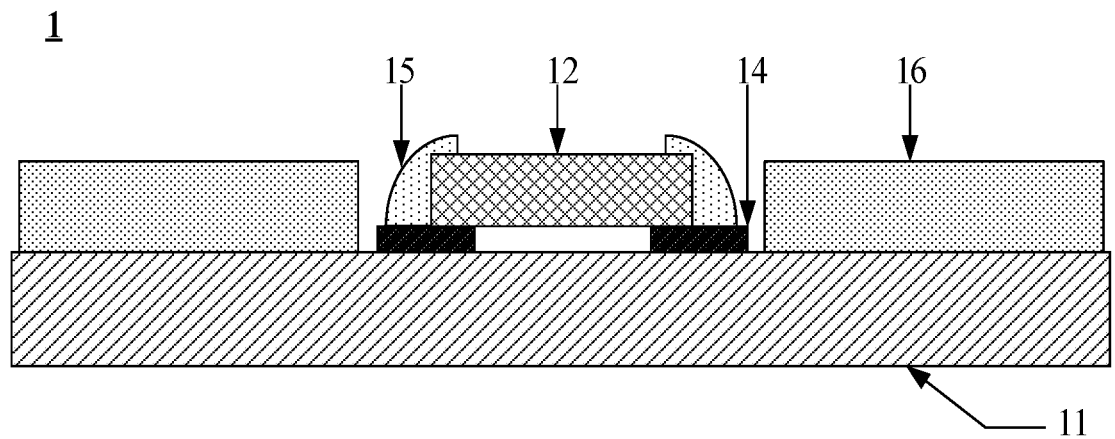
FIG. 16 is a structural diagram of still another display device according to the embodiments of the present disclosure.
Figure 17:
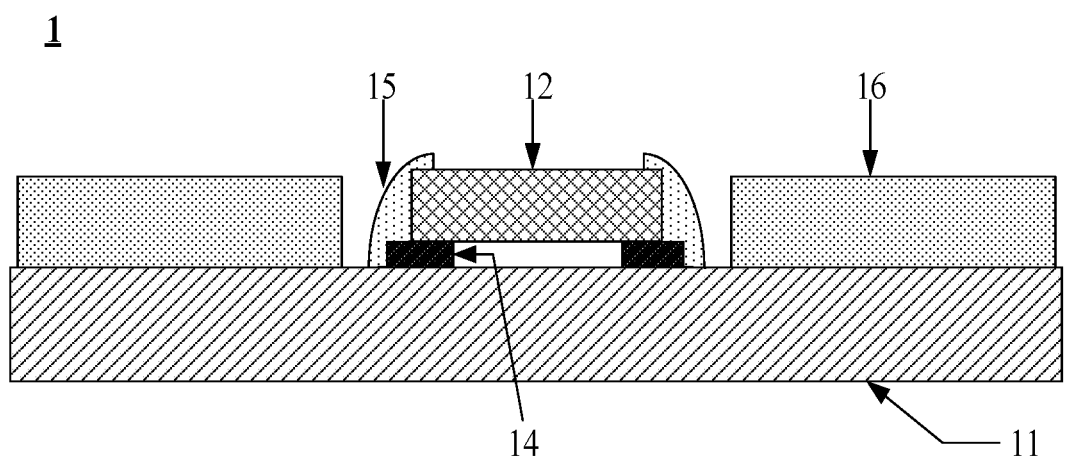
FIG. 17 is a structural diagram of still yet another display device according to the embodiments of the present disclosure.

Moreover, when the edge sealant layer 15 is attached to the fingerprint identification module, as shown in FIGS. 10 and 12, the edge sealant layer 15 may be attached to a side of the fingerprint identification module. Alternatively, as shown in FIGS. 16 and 17, the edge sealant layer 15 may also be attached to a side of the fingerprint identification module 12 and a side of the peripheral region of the fingerprint identification module 12 distal from the display panel 11. FIG. 16 is a cross-sectional view of the display device at C11 to C12 in FIG. 11, and FIG. 17 is a cross-sectional view of the display device at D11 to D12 in FIG. 13.

Further, in order to ensure that the edge sealant may effectively attach the frame sealant 14 and the fingerprint identification module 12, as shown in FIGS. 10 and 11, the orthographic projection of the outer frame of the frame sealant 14 on the display panel 11 may surround the orthographic projection of the finger identification module on the display panel 11.

Optionally, as shown in FIGS. 10, 12, 16, and 17, the display device 1 may further include a heat dissipation layer 16, wherein the heat dissipation layer 16 is used for heat dissipation. The heat dissipation layer 16 may be arranged around the outside of the region where the fingerprint identification flexible circuit board 13 and the fingerprint identification module 12 are arranged. Exemplarily, the heat dissipation layer 16 may be super clean foam (SCF).

Figure 18:
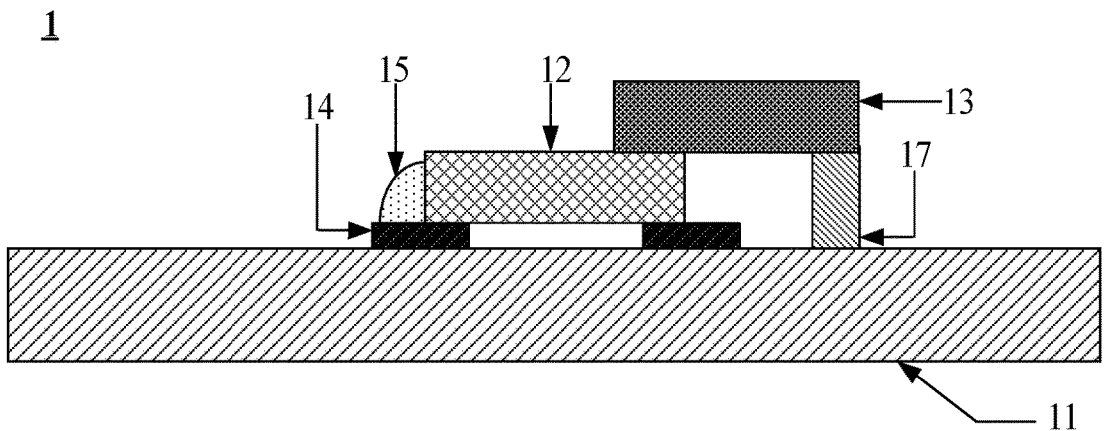
FIG. 18 is a cross-sectional view of another display device according to the embodiments of the present disclosure.

Moreover, as shown in FIG. 18, the display device 1 may further include at least a reinforcement 17. The reinforcement 17 may be a steel sheet. The reinforcement 17 is arranged on the side of the fingerprint identification flexible circuit board 13 distal from the fingerprint identification module 12, and is configured to protect the fingerprint identification flexible circuit, and the reinforcement 17 may also play a certain role in supporting the fingerprint identification flexible circuit. To facilitate viewing, the heat dissipation layer 16 is not shown in FIG. 18; FIG. 18 is a schematic diagram of the display device 1 including the reinforcement 17; and FIG. 18 is a cross-sectional view of the display device at B11 to B12 in FIG. 7.

It should be noted that, in the embodiments of the present disclosure, the arrangement of a through hole in the frame sealant 14 may also be adopted, such that the region enclosed by the frame sealant 14, the display panel 11, and the fingerprint identification module 12 is not a closed region.

In summary, in the display device according to the embodiment of the present disclosure, as the frame sealant is provided with an opening, the region enclosed by the frame sealant, the display panel, and the fingerprint identification module is no longer a closed region after the frame sealant is attached respectively to the display panel and the fingerprint identification module, such that air pressure in the region enclosed by the frame sealant, the display panel, and the fingerprint identification module can be kept as consistent as possible with outer air pressure, and thus the force generated on the display panel due to pressure difference of the above two air pressure is reduced, and the probability for occurrence of indentation and damage on the display panel is reduced.

Figure 19:
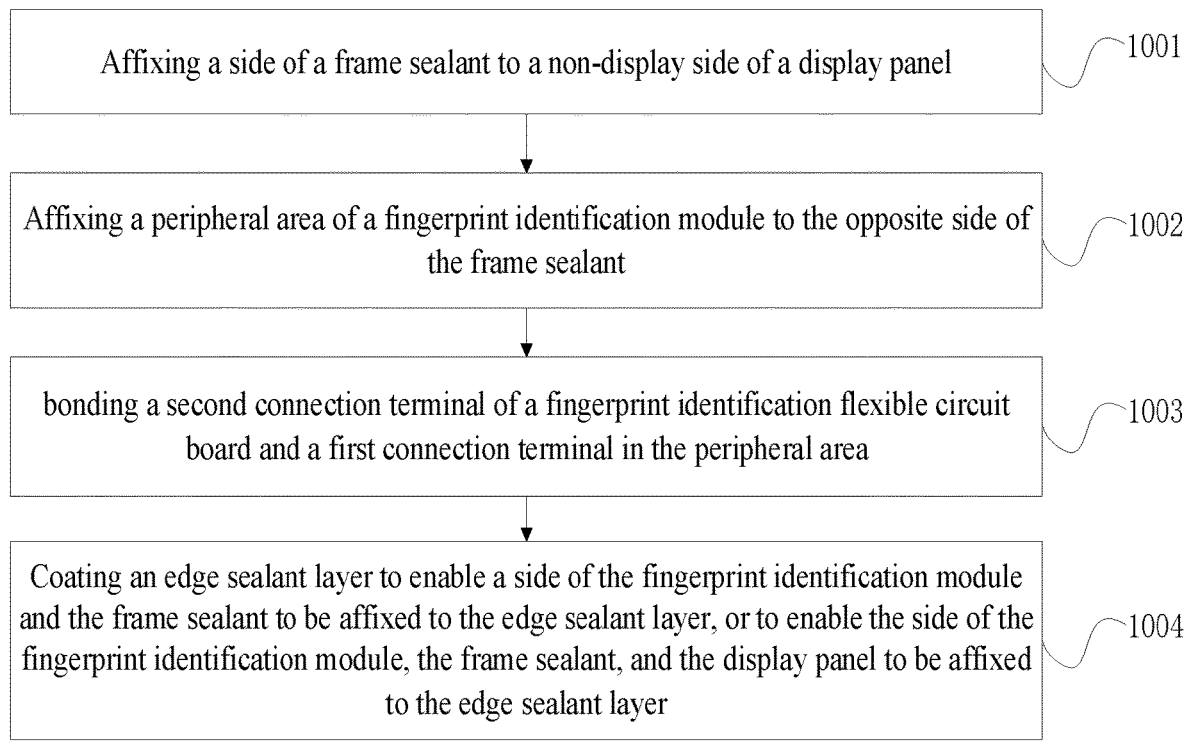
FIG. 19 is a flow diagram of an assembly method of a display device according to the embodiments of the present disclosure.

Embodiments of the present disclosure also provide an assembly method of a display device, as shown in FIG. 19, the method may include the following steps.

In step 1001, a side of frame sealant is attached to a non-display side of a display panel.

Figure 20:
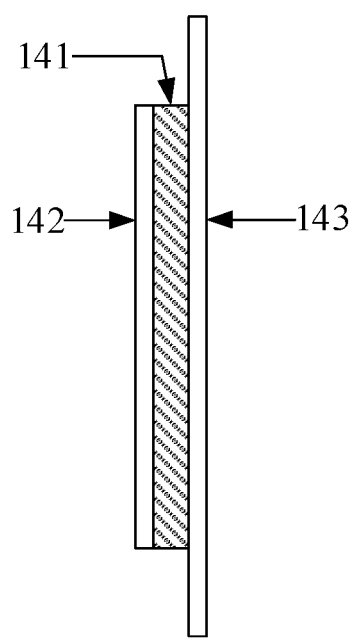
FIG. 20 is a structural diagram of a frame sealant according to the embodiments of the present disclosure.

Optionally, as shown in FIG. 20, two opposite sides of the colloid 141 of the frame sealant 14 may be attached respectively with a heavy release film 142 and a light release film 143 before the frame sealant is not used. Therefore, it is not difficult to understand that in the above embodiments of the display device, the frame sealant refers to the colloid of the frame sealant. Before the side of the frame sealant is attached to the non-display side of the display panel, one of the heavy release film and the light release film may be removed firstly, and then the exposed colloid is attached to the non-display side of the display panel. The heavy release film and the light release film may prevent the colloid from being polluted due to exposure, and ensure the adhesion of the colloid.

In step 1002, a peripheral region of a fingerprint identification module is attached to the opposite side of the frame sealant.

The fingerprint identification module is provided with a fingerprint identification region and the peripheral region surrounding the fingerprint identification region.

Before the peripheral region of the fingerprint identification module is attached to the opposite side of the frame sealant, the other of the heavy release film and the light release film may be removed firstly, and then the peripheral region of the fingerprint identification module is attached to the exposed colloid.

In step 1003, a second connection terminal of a fingerprint identification flexible circuit board and a first connection terminal in the peripheral region are bonded, wherein at least one opening is provided on a side of an orthographic projection of the frame sealant on the display panel proximal to the fingerprint identification flexible circuit board, and the at least one opening being at least partially overlapped with an orthographic projection of the fingerprint identification flexible circuit board on the display panel.

It should be noted that the second connection terminal and the first connection terminal may also be bonded firstly, and then the peripheral region of the fingerprint identification module is attached to the opposite side of the frame sealant.

Further, as shown in FIG. 19, after bonding the second connection terminal of the fingerprint identification flexible circuit board and the first connection terminal in the peripheral region, the method further includes:

In step 1004, an edge sealant layer is coated, so that a side of the fingerprint identification module and the frame sealant are both attached to the edge sealant layer, or the side of the fingerprint identification module, the frame sealant, and the display panel are all attached to the edge sealant layer.

The coating method of the edge sealant layer can ensure that the coated edge sealant layer satisfies the limitation on the edge sealant layer in the aforementioned embodiments of the display device, which is not repeated in detail herein.

In summary, in the assembly method of the display device according to the embodiment of the present disclosure, as the frame sealant is provided with an opening, the region enclosed by the frame sealant, the display panel, and the fingerprint identification module is no longer a closed region after the frame sealant is attached respectively to the display panel and the fingerprint identification module, such that air pressure in the region enclosed by the frame sealant, the display panel, and the fingerprint identification module can be kept as consistent as possible with outer air pressure, and thus the force generated on the display panel due to pressure difference of the above two air pressure is reduced, and the probability for occurrence of indentation and damage on the display panel is reduced.

A person of ordinary skill in the art can understand that all or part of the steps described in the above embodiments can be completed through hardware, or through a program which instructs relevant hardware, wherein the program can be stored in a computer-readable storage medium, such as a read-only memory, a disk, a CD, or the like.

The above descriptions are merely exemplary embodiments of the present disclosure, and are not intended to limit the present disclosure. Any modifications, equivalent substitutions or improvements that are made within the spirit and principle of the present disclosure should all be included in the protection scope of the present disclosure.

What is claimed is:

1. A display device, comprising a display panel, a fingerprint identification module, a fingerprint identification flexible circuit board, and a frame sealant, wherein
    the fingerprint identification module is disposed on a non-display side of the display panel, the fingerprint identification module comprises a fingerprint identification region and a peripheral region surrounding the fingerprint identification region, and the peripheral region is arranged with a first connection terminal;
    the fingerprint identification flexible circuit board is provided with a second connection terminal, and the second connection terminal is electrically connected with the first connection terminal; and
    the frame sealant is at least partially disposed between the display panel and the peripheral region of the fingerprint identification module, and is configured to bond the fingerprint identification module and the display panel,
    wherein at least one opening is provided on a side of an orthographic projection of the frame sealant on the display panel proximal to the fingerprint identification flexible circuit board, the at least one opening being at least partially overlapped with an orthographic projection of the fingerprint identification flexible circuit board on the display panel;
    wherein a span of a region where the frame sealant is provided with an opening in a reference direction is less than or equal to a width of the fingerprint identification flexible circuit board in the reference direction, the reference direction intersecting an opening direction of the opening.

2. The display device according to claim 1, wherein the orthographic projection of the fingerprint identification flexible circuit board on the display panel covers the at least one opening.

3. The display device according to claim 1, wherein the frame sealant is provided with an opening.

4. The display device according to claim 1, further comprising: an edge sealant layer, wherein an orthographic projection of an outer frame of the frame sealant on the display panel surrounds an orthographic projection of the edge sealant layer on the display panel, and the fingerprint identification module and the frame sealant are both attached to the edge sealant layer.

5. The display device according to claim 4, wherein a distance between an inner frame and the outer frame of the frame sealant, at any position of the frame sealant, ranges approximately from 2.5 mm to 3 mm.

6. The display device according to claim 1, further comprising: an edge sealant layer, wherein an orthographic projection of an outer frame of the edge sealant layer on the display panel surrounds the orthographic projection of the frame sealant on the display panel, and the fingerprint identification module, the frame sealant, and the display panel are all attached to the edge sealant layer.

7. The display device according to claim 6, wherein a distance between an inner frame and the outer frame of the frame sealant, at any position of the frame sealant, ranges approximately from 1.5 mm to 1.8 mm.

8. The display device according to claim 4, wherein a region enclosed by the frame sealant and the at least one opening is in a polygonal shape, and the frame sealant, except for a side thereof provided with the opening, is attached to the fingerprint identification module by the edge sealant layer.

9. The display device according to claim 8, wherein the region enclosed by the frame sealant and the at least one opening is in a rectangular shape.

10. The display device according to claim 4, wherein the edge sealant layer is attached to a side of the fingerprint identification module.

11. The display device according to claim 1, wherein the orthographic projection of an outer frame of the frame sealant on the display panel surrounds the orthographic projection of the fingerprint identification module on the display panel.

12. The display device according to claim 1, wherein the frame sealant is provided with a plurality of openings, and a distance between each adjacent two openings is equal.

13. The display device according to claim 1, wherein the frame sealant is provided with a plurality of openings, opening surfaces of the plurality of openings being equal in size.

14. An assembly method of a display device, comprising:
attaching a side of frame sealant to a non-display side of a display panel;
attaching a peripheral region of a fingerprint identification module to the opposite side of the frame sealant, wherein the fingerprint identification module is provided with a fingerprint identification region and the peripheral region surrounding the fingerprint identification region; and
bonding a second connection terminal of a fingerprint identification flexible circuit board and a first connection terminal in the peripheral region, wherein at least one opening is provided on a side of an orthographic projection of the frame sealant on the display panel proximal to the fingerprint identification flexible circuit board, the at least one opening being at least partially overlapped with an orthographic projection of the fingerprint identification flexible circuit board on the display panel;
wherein a span of a region where the frame sealant is provided with an opening in a reference direction is less than or equal to a width of the fingerprint identification flexible circuit board in the reference direction, the reference direction intersecting an opening direction of the opening.

15. The method according to claim 14, wherein after bonding the second connection terminal of the fingerprint identification flexible circuit board and the first connection terminal in the peripheral region, the method further comprises:
coating an edge sealant layer to cause a side of the fingerprint identification module and the frame sealant to be attached to the edge sealant layer.

16. The method according to claim 14, wherein after bonding the second connection terminal of the fingerprint identification flexible circuit board and the first connection terminal in the peripheral region, the method further comprises:
coating an edge sealant layer to cause the side of the fingerprint identification module, the frame sealant, and the display panel to be attached to the edge sealant layer.

17. The display device according to claim 2, further comprising: an edge sealant layer, wherein an orthographic projection of an outer frame of the frame sealant on the display panel surrounds an orthographic projection of the edge sealant layer on the display panel, and the fingerprint identification module and the frame sealant are both attached to the edge sealant layer.

18. The display device according to claim 3, further comprising: an edge sealant layer, wherein an orthographic projection of an outer frame of the frame sealant on the display panel surrounds an orthographic projection of the edge sealant layer on the display panel, and the fingerprint identification module and the frame sealant are both attached to the edge sealant layer.

* * * * *